United States Patent [19]

Gavin, Jr.

[11] Patent Number: 5,048,241
[45] Date of Patent: Sep. 17, 1991

[54] LAWN EDGING APPARATUS

[76] Inventor: Justin J. Gavin, Jr., c/o Cabin 1 820 Water St., Prairie du Sac, Wis. 53578

[21] Appl. No.: 475,224

[22] Filed: Feb. 5, 1990

[51] Int. Cl.$^5$ .......................... E02D 2/00; A01G 1/00
[52] U.S. Cl. ........................................... 52/102; 47/33; 404/6
[58] Field of Search .................. 52/102; 47/33; 404/6, 404/7

[56] References Cited

U.S. PATENT DOCUMENTS

| | | | |
|---|---|---|---|
| 1,195,697 | 8/1916 | Lord | 52/102 |
| 1,924,008 | 8/1933 | Weil | 52/60 |
| 2,713,751 | 7/1955 | Hendrixson | 47/33 |
| 3,041,781 | 7/1962 | Richter | 47/33 |
| 3,495,352 | 2/1970 | Sbare | 47/33 |
| 4,809,459 | 3/1989 | Brylla | 52/102 |
| 4,897,973 | 2/1990 | Foster | 52/102 |

FOREIGN PATENT DOCUMENTS 673410  11/1963  Canada .................................. 52/102

Primary Examiner—Henry E. Raduazo
Attorney, Agent, or Firm—Leon Gilden

[57] ABSTRACT

An apparatus is set forth including a first shield with a first "J" shaped end mounted within a second "J" shaped end of a second shield to permit relative pivotment of the first shield relative to the second shield. The "J" shaped end of the second shield is of a complementary configuration receivable slidably within the first "J" shaped end. Modifications of the instant invention include the second shield provided with a further leg oriented orthogonally relative to the shield to be directed interiorly of an underlying ground surface preventing undesirable instrusion of vegetation underlying the shield area. Further, serrated metallic reinforcing edges may be mounted to free ends of the shield to enhance their being directed interiorly of a ground surface.

1 Claim, 4 Drawing Sheets

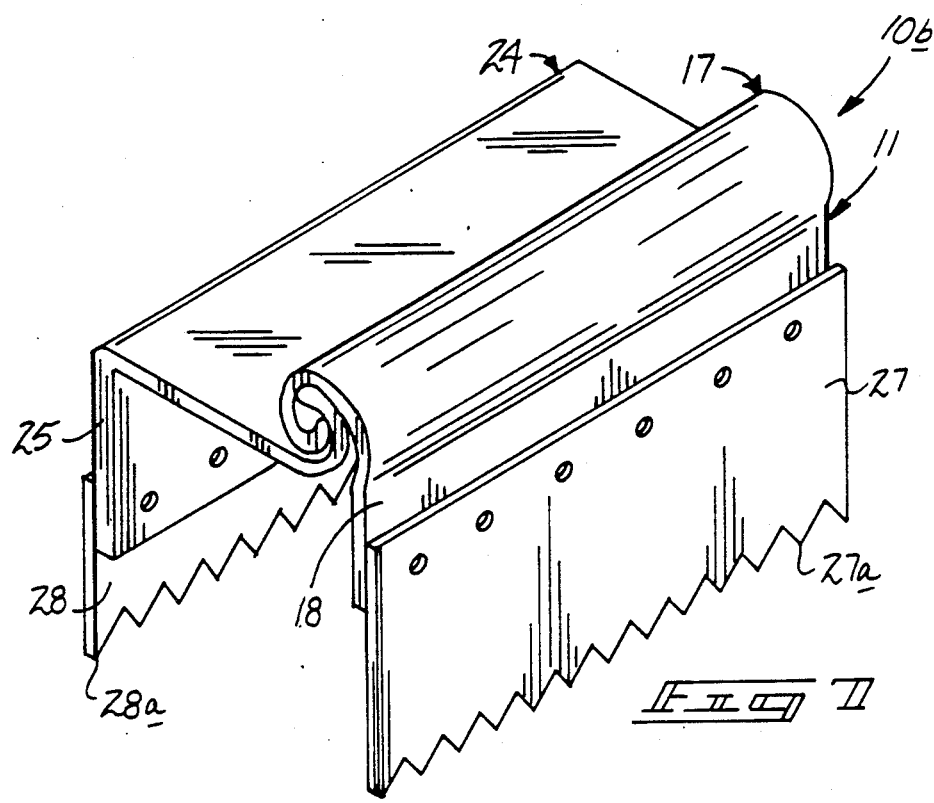
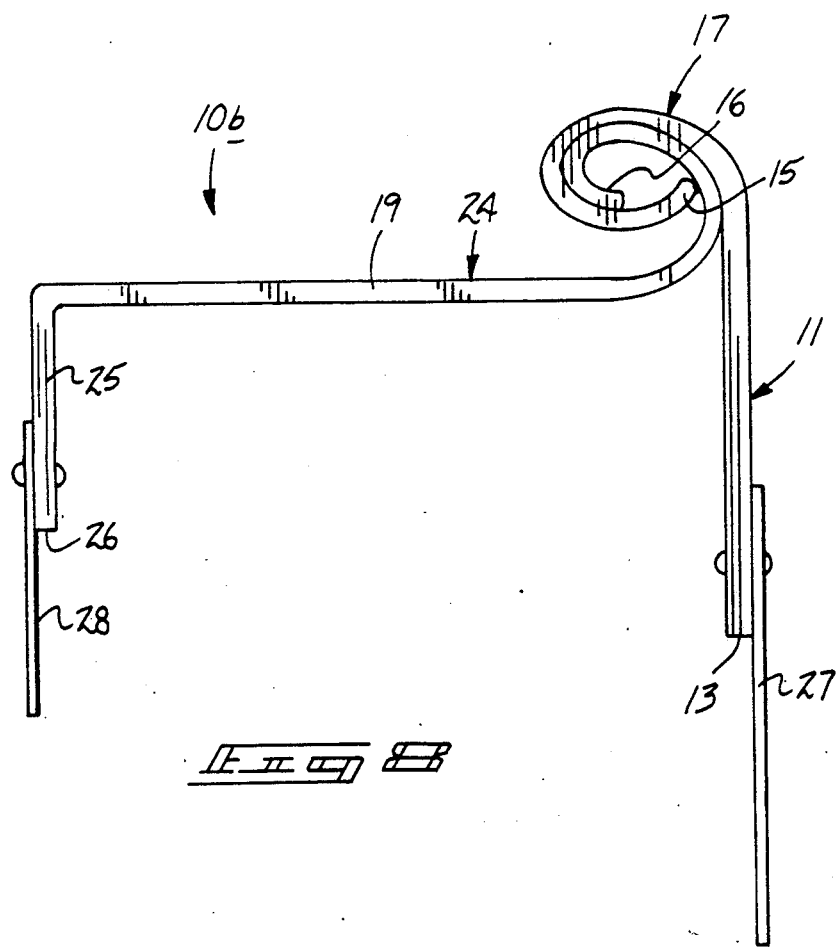

LAWN EDGING APPARATUS

BACKGROUND OF THE INVENTION

1. Field of the Invention

The field of invention relates to lawn edging apparatus, and more particularly pertains to a new and improved lawn edging apparatus wherein the same is securable in protecting of a desired length of lawn and simultaneously enable pivotment of a portion of the shield relative to a further portion to prevent access to areas covered by the shield during trimming, weeding, and the like.

2. Description of the Prior Art

Lawn edging apparatus is well known in the prior art. Heretofore, however, lawn edging apparatus has been of a relatively stationary configuration limiting access to areas underlying the edging once such edging has been placed in position. The instant invention attempts to overcome deficiencies of the prior art by permitting access to areas covered by the shield subsequent to the shield's positioning within an underlying ground surface. Examples of the prior art include U.S. Pat. No. 3,676,952 to Watts providing a lawn edging apparatus of a generally "U" shaped configuration for piercing and securement to a surface of ground for permanent overlying securement of such ground U.S. Pat. No. 4,497,472 to Johnson sets forth a lawn edging device wherein a flange is mounted adjacent a fence post preventing intrusion of vegetation adjacent the fence and associated fence post.

U.S. Pat. No. 4,548,388 to Cobler sets forth a fence protector typical of the prior art of a rigid elongate member mounted adjacent the fence preventing growth of vegetation relative to the fence edge.

U.S. Pat. No. 4,478,391 to Kovach sets forth a vegetation guard for placement beneath a fence to prevent growth about the fence disposed of a generally "U" shaped elongate member mounted coextensively with a fence.

U.S. Pat. No. 3,545,127 to Jensen sets forth a lawn edging arrangement wherein a first projecting member is positioned overlying a curb portion adjacent a lawn, with a further member directed outwardly of the first portion to overlie the lawn in preventing intrusion of vegetation adjacent a lawn surface.

As such, it may be appreciated that there is a continuing need for a new and improved lawn edging apparatus wherein the same addresses both the problems of ease of use and effectiveness in construction in enabling subsequent access to area underlying the edging organization subsequent to positioning of the apparatus to an underlying ground surface.

SUMMARY OF THE INVENTION

In view of the foregoing disadvantages inherent in the known types of lawn edging apparatus now present in the prior art, the present invention provides a lawn edging apparatus wherein the same provides a plurality of relatively pivotal members to overlie a ground surface and simultaneously provide anchoring of a portion of the apparatus to enable access to an underlying ground surface subsequent to positioning of the organization thereon. As such, the general purpose of the present invention, which will be described subsequently in greater detail, is to provide a new and improved lawn edging apparatus which has all the advantages of the prior art lawn edging apparatus and none of the disadvantages.

To attain this, the present invention provides an apparatus including a first shield with a first "J" shaped end mounted within a second "J" shaped end of a second shield to permit relative pivotment of the first shield relative to the second shield. The "J" shaped end of the second shield is of a complementary configuration receivable slidably within the first "J" shaped end. Modifications of the instant invention include the second shield provided with a further leg oriented orthogonally relative to the shield to be directed interiorly of an underlying ground surface preventing undesirable intrusion of vegetation underlying the shield area. Further, serrated metallic reinforcing edges may be mounted to free ends of the shield to enhance their being directed interiorly of a ground surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn edging apparatus which has all the advantages of the prior art lawn edging apparatus and none of the disadvantages.

It is another object of the present invention to provide a new and improved lawn edging apparatus which may be easily and efficiently manufactured and marketed.

It is a further object of the present invention to provide a new and improved lawn edging apparatus which is of a durable and reliable construction.

An even further object of the present invention is to provide a new and improved lawn edging apparatus which is susceptible of a low cost of manufacture with regard to both materials and labor, and which accordingly is then susceptible of low prices of sale to the consuming public, thereby making such lawn edging apparatus economically available to the buying public.

Still yet another object of the present invention is to provide a new and improved lawn edging apparatus which provides in the apparatuses and methods of the prior art some of the advantages thereof, while simultaneously overcoming some of the disadvantages normally associated therewith.

Still another object of the present invention is to provide a new and improved lawn edging apparatus comprising two relatively elongate "J" shaped members slidably securable together to form an interlocking hinge and allowing pivotment of one member relative to another member enabling access to an underlying ground surface for inspection and maintenance of an underlying ground surface subsequent to positioning of the apparatus.

These together with other object of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of a further modified construction of the instant invention.

FIG. 8 is an orthographic side view taken in elevation of the further modified instant invention to the lawn edging apparatus.

DESCRIPTION OF THE PREFERRED EMBODIMENT

Figure 1:
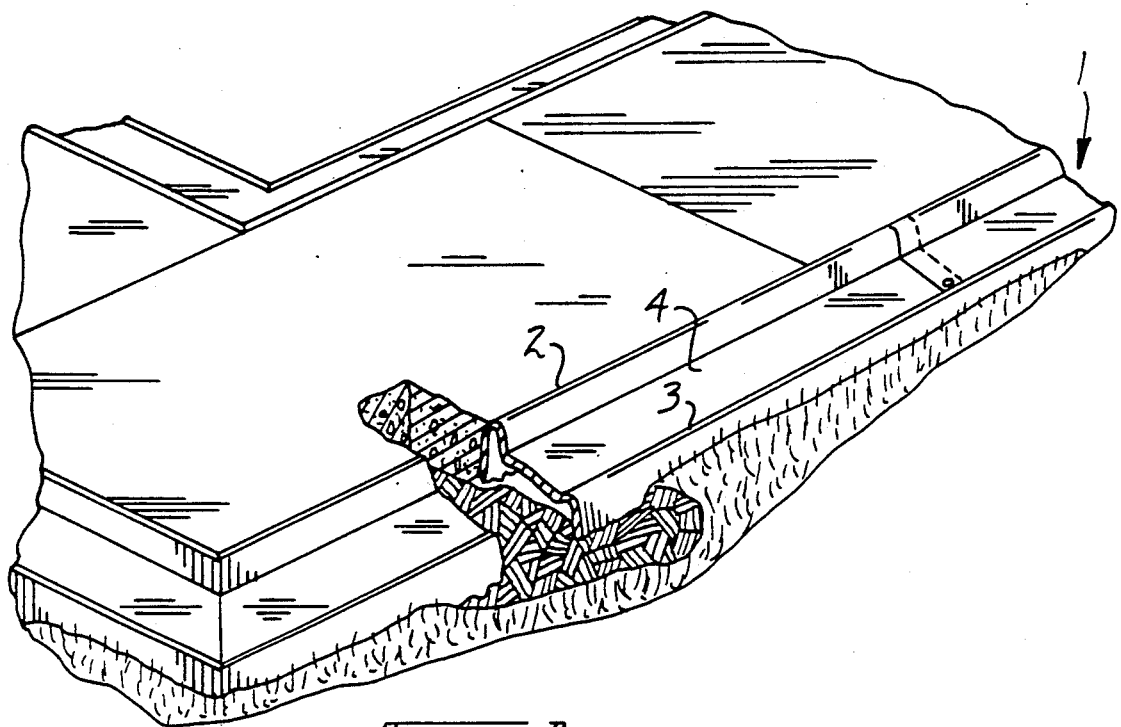
FIG. 1 is an isometric illustration of a prior art lawn edging apparatus.
Figure 2:
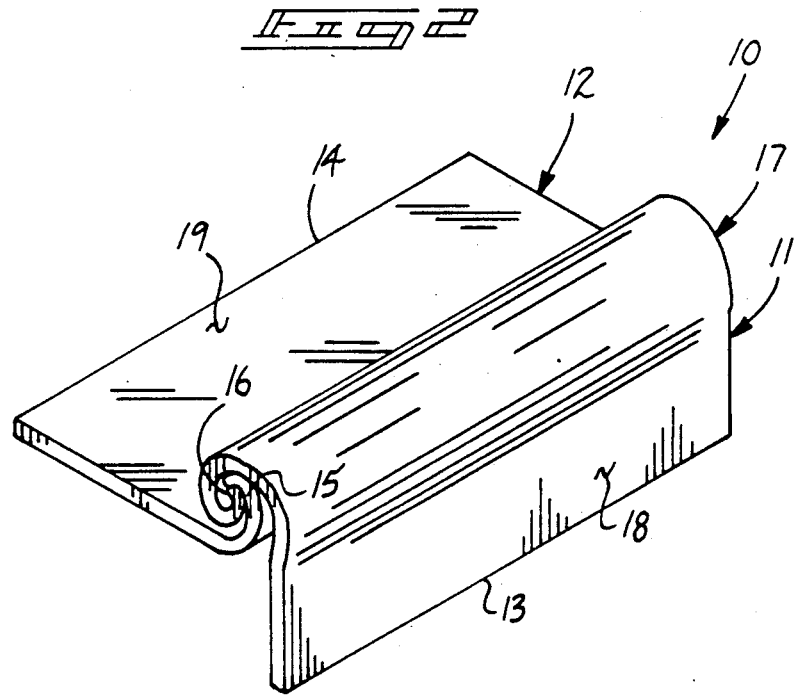
FIG. 2 is an isometric illustration of the instant invention.

With reference now to the drawings, and in particular to FIGS. 1 to 8 thereof, a new and improved lawn edging apparatus embodying the principles and concepts of the present invention and generally designated by the reference numerals 10, 10a and 10b will be described.

FIG. 1 illustrates a prior art lawn edging apparatus 1 defined as a generally elongate member defined by a first channel 2 and a second channel 3 coextensively arranged relative to one another and secured by a central web 4. The prior art, as illustrated, is typical of lawn edging organizations of a rigid member that once in position limits access to underlying ground so covered.

Figure 3:
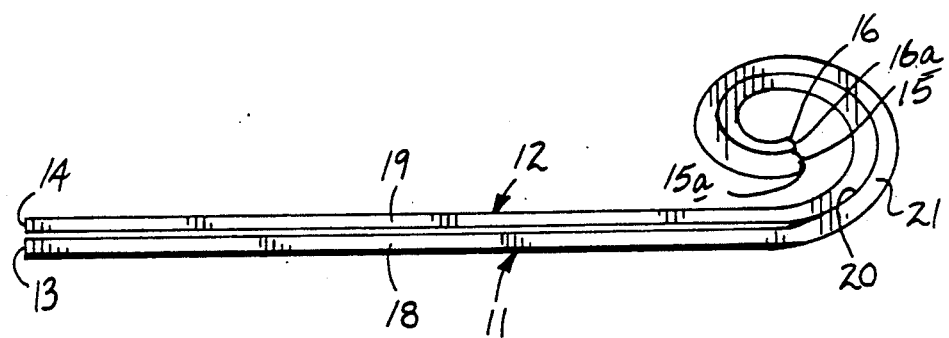
FIG. 3 is an orthographic side view taken in elevation of the instant invention in a stored relationship.

More specifically, the lawn edging apparatus 10 of the instant invention essentially comprises a first shield 11 mounted to a second shield 12. Each shield 11 and 12 is formed of a semi-rigid polymeric material. The first shield 11 includes a first free elongate edge 13, wherein the second shield 12 is formed with a comparable second elongate edge 14. Each elongate edge extends coextensively of each shield. The first shield 11 includes a first "J" shaped interior end 15 surroundingly mounting a second "J" shaped interior end of the second shield 12. Each "J" shaped end defines the remote and parallel end of each shield, wherein each of the respective ends 14 and 15 are arranged generally parallel to the first and second elongate edges respectively. The first and second "J" shaped interior ends 15 and 16 terminate in a respective first and second interior edge 15a and 16a as illustrated in FIG. 3 for example. Further, it should be noted that the second "J" shaped end 16 is slidably receivable in a complementary manner within the first "J" shaped end 15, wherein the first "J" shaped end 15 is defined by a first internal arcuate surface of a complementary configuration to the external arcuate surface defined by the second "J" shaped end, as illustrated in FIG. 3.

Figure 4:
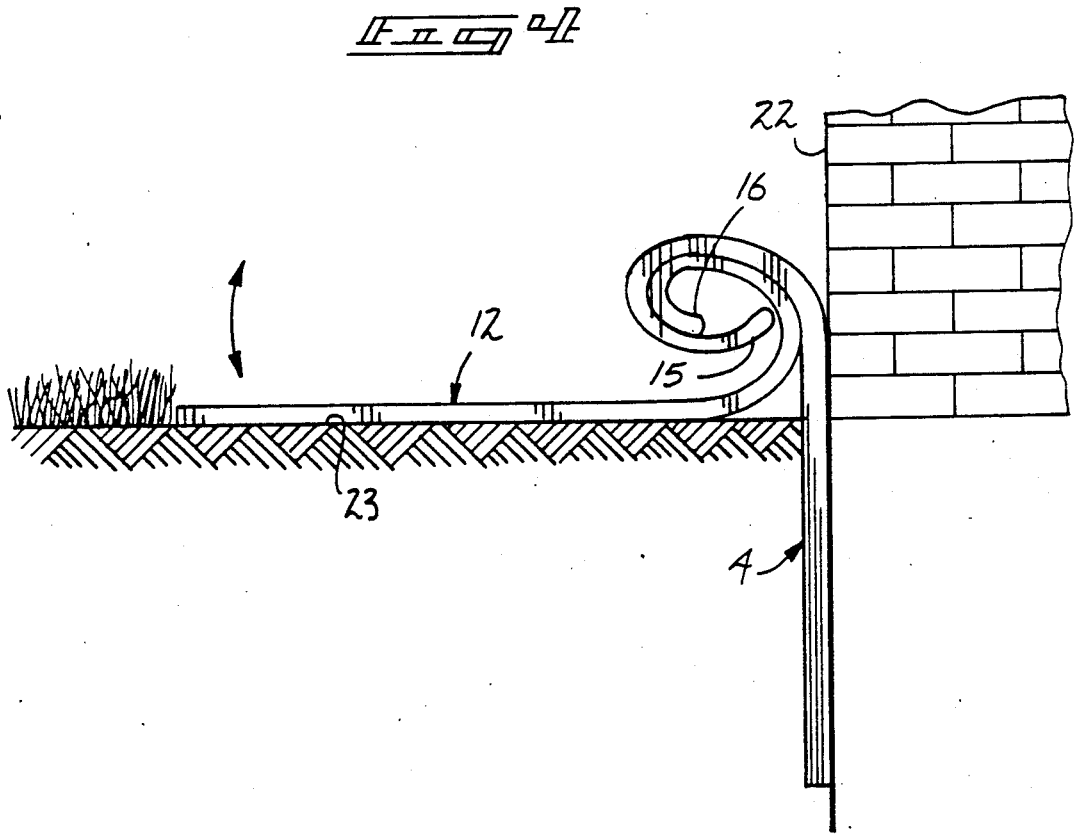
FIG. 4 is an orthographic side view of the instant invention in position within a ground surface to be protected.

The first and second shields 11 and 12 are defined by a generally first and second respective planar wall member 18 and 19 that will overlie one another in a stored relationship prior to their being utilized, and upon securement within an underlying ground surface 23 adjacent a curb or building 22, as illustrated in FIG. 4, the first and second shields 11 and 12 may be pivotally rotated relative to one another at generally ninety degrees to enable anchoring of the first shield 11 within the surface 23 while the second shield 12 overlies that surface. Subsequently, for inspection and maintenance of the ground 23 underlying the second shield 12, the second shield 12 may be pivoted relative to the first shield permitting such use.

Figure 5:
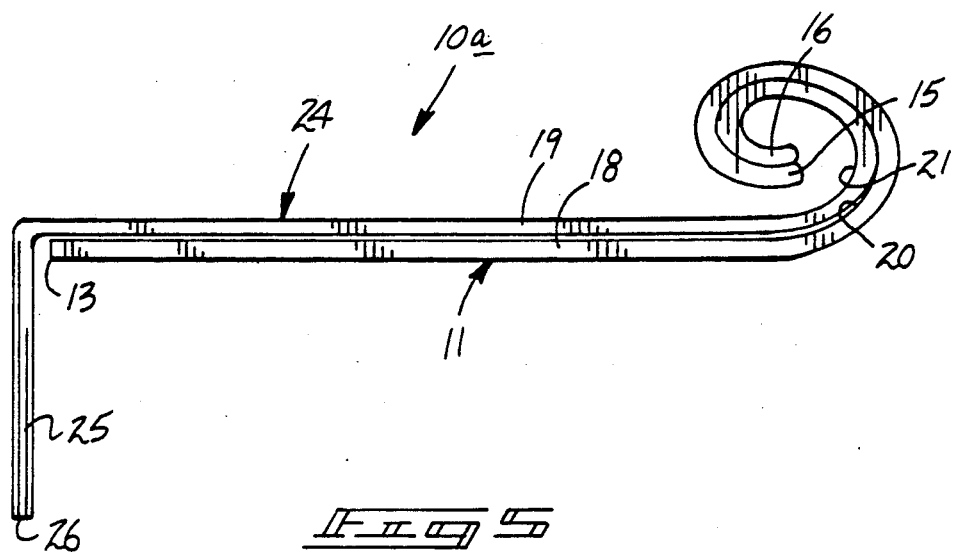
FIG. 5 is an orthographic side view taken in elevation of a modification of the instant invention.
Figure 6:
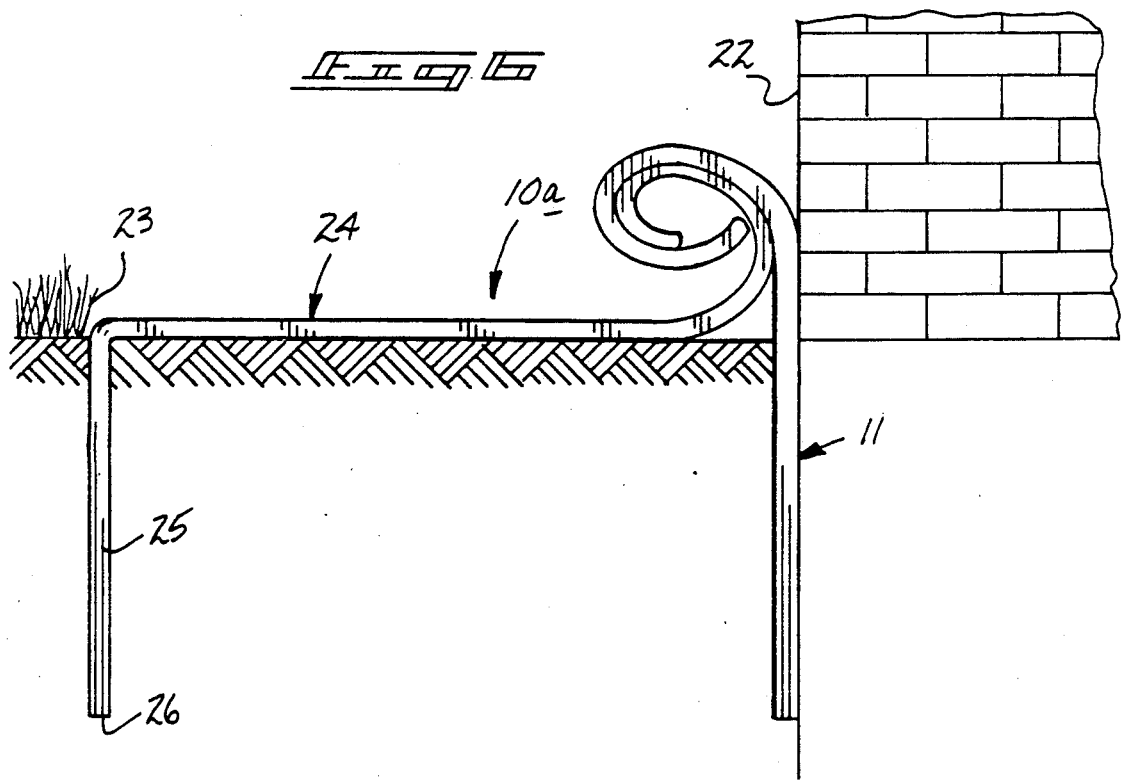
FIG. 6 is an orthographic side view of the modification of the instant invention in position relative to an underlying ground surface.

FIG. 5 is illustrative of a modified lawn edging apparatus 10a, wherein the second shield 24 includes not only the second planar wall member 19, but a third planar wall member 25 coextensively and orthogonally arranged relative to the second planar wall member 19. The third planar wall member 25 terminates at a third wall edge 26 arranged generally parallel to a first elongate edge 13 of the first shield. In the first embodiment, the second shield terminates in a second elongate edge 14, as illustrated in FIG. 3 for example, but the second embodiment, as illustrated in FIG. 5, provides the third planar wall member 25 for enhanced anchoring of the second shield relative to the first shield while also permitting subsequent pivotment of the second shield by merely pivoting the second shield and its associated second and third planar wall members 19 and 25 from the ground surface 23.

FIGS. 7 and 8 illustrate a further modified lawn edging apparatus 10b wherein the first shield 11 and the second shield 24 are provided with rigid serrated plates to provide rigidity to the organization, wherein the first plate 27 is defined by a first length terminating in a first serrated free end for piercing the ground surface 23, with the second plate 28 defined by a second length less than that of the first length to permit ease of removal of the second shield 24 from the ground surface while simultaneously providing enhanced rigidity as desired, with the second serrated plate 28 permitting ease of entrance of the second shield 24 within a ground surface that is otherwise more difficult to pierce, wherein the second serrated plate 28 terminates in a second serrated free end 28a for this purpose.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn edging apparatus comprising,
   a first shield means for piercing securement into an underlying ground surface, and
   a second shield means for overlying the ground surface, and
   the first and second shield means each including a respective first and second free edge, and
   each first and second shield means further including a respective first and second edge means for pivotal securement together for permitting pivotment of the first shield means relative to the second shield means, and
   wherein the first shield means includes a first planar wall member, the first planar wall member terminating in the first free edge at one end and in the first edge means at the other end, the first free edge and the first edge means aligned parallel relative to one another and the first edge means of a generally "J" shaped configuration, and the second shield means including a second planar wall member terminating in the second free edge at one end and in the second edge means at the other end, wherein the second edge means is of a generally "J" shaped configuration, the second edge means slidably receivable within the first edge means longitudinally thereof, and
   wherein the first edge means defines a first arcuate interior surface to complementarily receive an exterior surface of the second edge means, and
   wherein the first edge means and the second edge means are continuous throughout and coextensive with the respective first and second planar wall member respectively, and
   wherein the second planar wall member includes a third planar wall member mounted integrally and orthogonaly relative to the first planar wall member remote from the second edge means, and
   wherein the first shield means and the second shield means are formed of a semi-rigid polymeric material, and
   wherein the third planar wall member includes a second serrated plate mounted coextensively to a lowermost end thereof defined by a second length, and wherein the first planar wall member includes a first serrated plate mounted coextensively therewith, wherein the first serrated plate is defined by a first length, wherein the first length is greater than the second length.

* * * * *